C. H. & J. H. HARNLY.
Manure Fork.
No. 64,861.
Patented May 21, 1867.
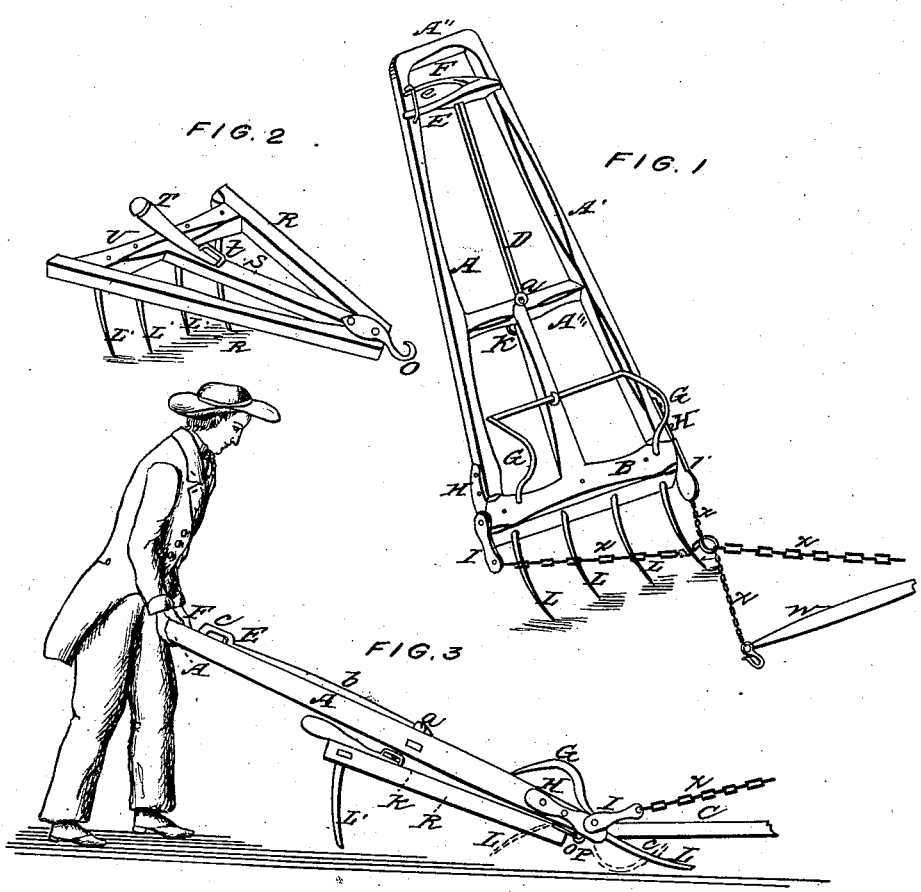

United States Patent Office.

CHRISTIAN H. AND JOSEPH H. HARNLY, OF PENN TOWNSHIP, PENNSYLVANIA.

Letters Patent No. 64,861, dated May 21, 1867.

---

MANURE-DRAG

---

*The Schedule referred to in these Letters Patent and making part of the same.*

---

TO ALL WHOM IT MAY CONCERN:

Be it known that we, CHRISTIAN H. HARNLY and JOSEPH H. HARNLY, of Penn Township, in the county of Lancaster, and State of Pennsylvania, have invented a new and improved Manure-Drag; and we do hereby declare that the following is a full, clear, and exact description of the construction and operation of the same, reference being had to the annexed drawings, making a part of this specification, in which—

Figure 1 is a perspective view of the single drag.

Figure 2, a perspective view of the attachment to form a double drag, or hook and fork combined.

Figure 3 is a side elevation of both connected, and illustrates the change of parts of fig. 1.

The nature of our invention consists in arranging a drag or fork in such a manner as to be easily operated and discharged, and, in order to expedite cleaning large stables, to enable us to attach an additional hook and clean two stalls at one operation.

To enable others skilled in the art to make and use our invention, we will proceed to describe its construction and operation.

We propose, as the proper proportions, to make the side pieces A A', fig. 1, five and a half feet long, top cross-piece A'' one foot, central cross-piece one foot nine inches, rear or turning-beam two feet four inches, having, say, four tines, thirteen inches long, slightly curved. The fork-head B turns on a pivot in a side-plate, H, which is connected with the side pieces A A'. To this fork-head B there is a central handle, C, which also holds by a staple the cross-connection of the runners G; said runners being attached to the top of the rake-head and revolve with it and the arm or handle C. The upper end of said arm fits into a notch made in the cross-piece A''', and is kept in place by a central rod or strip, D, which latter is connected to an arm, E, affixed by a pivot, having a spring, F, bearing upon it to keep it in place, both held in position by a long staple, e, on the top of the side piece A, in which staple the cross-arm E has its play. There is also a plate, I, on each side on the pivot of the fork-head, with which a chain, x, is connected, say two feet long, with a ring, from which two other chains of equal length connect with the ends of a spreader, W, and traces for the horse.

The operation is such that when the tines L are thrust into the manure, the sides form a handle to guide the machine, the horse being started, and, when brought to its destination, it is only necessary to draw the lever E upward, which dislodges the end of the clamp-rod D sliding in a staple, a, from the fork-arm C, and the draught of the horse will cause the rake-head to turn round bringing the runners G underneath, and consequently throw the tines back, as indicated by the dotted outlines, fig. 3, and thereby become detached and leave their contents at the desired place. In addition, and in connection with my fork, I also use a triangular rake-drag, fig. 2, centrally, three feet in length, and, say, two feet wide at the base of the triangle, where there are also four vertical tines L' of like length and curve as those in the fork. At the apex of the triangle R R U there is a hook, O, by which it is connected to the fork-head B, fig. 1, which latter has a ring, P, beneath it for the reception of the hook. The fork has also a hook, K, centrally beneath the cross-piece A'''. The joint operation is such that when the fork, fig. 1, is inserted and the rake-drag, fig. 2, (being attached by its hook,) in place, the tines are thrust into the manure of the next stall behind, when both will act and remove a double load. To dislodge the rake-drag it is only necessary to raise it by the central handle T, and hitch the long staple t into the hook K beneath the cross-piece A''' of the fork-drag, and dislodge the tines of the fork in manner aforesaid, and both will be in position for returning for a fresh load.

Having tested our invention and discovered its efficiency, we feel confident that others who wish to gain time and do this kind of work with ease to themselves, will hail our invention as one of the labor-saving machines of the day. We are aware that numerous inventions for this object are patented, but, being practical farmers, we feel desirous to add another and what we deen an improved arrangement, single or combined.

What we claim as our invention, and desire to secure by Letters Patent, is—

1. The arrangement of the fork-drag A A' A'' A''', with its spring and lever F E, clamp-rod D, and armed fork-head C B, runners G, all combined and operating substantially in the manner specified.

2. In combination with the fork-drag, fig. 1, and its ring O and hook K, we also claim the rake-drag, fig. 2, when used in connection with the said fork-drag, in the manner and for the purpose set forth.

CHRISTIAN H. HARNLY,
JOSEPH H. HARNLY.

Witnesses:
WM. B. WILEY,
J. STAUFFER.